United States Patent
Wang et al.

(10) Patent No.: US 10,863,427 B2
(45) Date of Patent: Dec. 8, 2020

(54) WIRELESS COMMUNICATION METHOD, APPARATUS AND SYSTEM

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/468,612

(22) PCT Filed: Dec. 30, 2016

(86) PCT No.: PCT/CN2016/113652
§ 371 (c)(1),
(2) Date: Jun. 11, 2019

(87) PCT Pub. No.: WO2018/120083
PCT Pub. Date: Jul. 5, 2018

(65) Prior Publication Data
US 2020/0100172 A1    Mar. 26, 2020

(51) Int. Cl.
H04W 48/16 (2009.01)
H04W 16/24 (2009.01)

(52) U.S. Cl.
CPC ........... *H04W 48/16* (2013.01); *H04W 16/24* (2013.01)

(58) Field of Classification Search
CPC .................................................. H04W 48/16
USPC ........................................................ 455/434
See application file for complete search history.

(56) References Cited

U.S. PATENT DOCUMENTS

| 2004/0160361 A1* | 8/2004 | Izzat ..................... H01Q 1/246 342/360 |
| 2012/0207128 A1 | 8/2012 | Wang |
| 2014/0185480 A1 | 7/2014 | Lee et al. |
| 2015/0103800 A1 | 4/2015 | Seo et al. |
| 2016/0021581 A1* | 1/2016 | Deenoo ............. H04W 36/0069 370/331 |
| 2018/0152924 A1 | 5/2018 | Ouchi |

FOREIGN PATENT DOCUMENTS

| WO | 2009/130199 | 10/2009 |
| WO | 2016/186044 A1 | 11/2016 |

OTHER PUBLICATIONS

The Extended European Search Report dated Sep. 3, 2019 for the related European Patent Application No. 16925590.8.
International Search Report of PCT application No. PCT/CN2016/113652 dated Sep. 30, 2017.
3GPP TSG RAN WG1 Meeting #87, R1-1612228, "Proposal of subcell", Nov. 14-18, 2016.

* cited by examiner

*Primary Examiner* — Joel Ajayi
(74) *Attorney, Agent, or Firm* — Seed IP Law Group LLP

(57) ABSTRACT

There are provided a user equipment (UE), a base station (BS) and a method for a UE. The user equipment (UE) at a first node comprises: a transceiver operative to transmit and receive data to and from a second node; and a circuitry operative to use at least a subcell identifier (ID) for physical layer behaviors, wherein the subcell ID is assigned for UEs in a same subcell, and a cell is divided into subcells in different divisions of a type of domain.

9 Claims, 7 Drawing Sheets a) Subcell in beam domain　　b) Subcell in frequency resource domain　　c) Subcell in coverage domain

WIRELESS COMMUNICATION METHOD, APPARATUS AND SYSTEM

BACKGROUND

1. Technical Field

The present technology relates to wireless communication field, and more particular, to a wireless communication method, apparatus and system.

2. Description of the Related Art

In a wireless communication field, end-user radio or wireless terminals, also known as user equipments (UEs), communicate via a wireless network such as a radio access network (RAN) with a radio base station (RBS), also called "eNodeBs" (eNBs). The radio access network (RAN) covers a geographical area which is divided into cell areas, with each cell area being served by a radio base station.

SUMMARY

One non-limiting and exemplary embodiment facilitates providing a flexible and efficient wireless communication method, apparatus and system.

In one general aspect, there is provided a user equipment (UE), at a first node, comprising: a transceiver operative to transmit and receive data to and from a second node; and a circuitry operative to use at least a subcell identifier (ID) for physical layer behaviors, wherein the subcell ID is assigned for UEs in a same subcell, and a cell is divided into subcells in different divisions of a type of domain.

In another general aspect, there is provided a base station, comprising: a transceiver operative to transmit and receive data to and from user equipments; and a circuitry operative to divide a cell into subcells in different divisions of a type of domain, wherein a subcell identifier (ID) is assigned for user equipments (UEs) in a same subcell, and at least a subcell ID is used for physical layer behaviors at UEs.

In another general aspect, there is provided a method for a user equipment (UE), at a first node, comprising: transmitting and receiving data to and from a second node; and using at least a subcell identifier (ID) for physical layer behaviors, wherein the subcell ID is assigned for UEs in a same subcell, and a cell is divided into subcells in different divisions of a type of domain.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will now be described with reference to FIGS. 1 through 10, which relate to a communication method, apparatus and system. It is understood that the present technology may be embodied in many different forms and in many different orders and should not be construed as being limited to the embodiments set forth herein. Rather, these embodiments are provided so that this disclosure will be thorough and complete and will fully convey the present technology to those skilled in the art. Indeed, the present technology is intended to cover alternatives, modifications and equivalents of these embodiments, which are included within the scope and spirit of the technology as defined by the appended claims. Furthermore, in the following detailed description of the present technology, numerous specific details are set forth in order to provide a thorough understanding of the present technology. However, it will be clear to those of ordinary skill in the art that the present technology may be practiced without such specific details.

While orders of the steps of the methods and the structures of the components are provided herein for exemplary purposes, but not for limitation. The following detailed description of the technology will be presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

Cell split is a method to allow good resource reusing and well known in 3GPP. Some small base stations like femto/pico could allow dense deployment of cells with small size. But the cell split is normally performed by dividing a cell into different small cells in different locations. And further, in this case, the resource split or cell split is rather static and relies on nice network planning in advance. In addition, dense deployment of small cells in the network would largely consume UEs' power especially considering UEs' mobility and handover. The air interface overhead in the network is also large due to synchronization signal and system information broadcast including Physical Broadcast Channel (PBCH).

So the traditional cell split is not flexible in dividing a cell into small cells, and consumes large resources such as power and air interface overhead.

Figure 1:
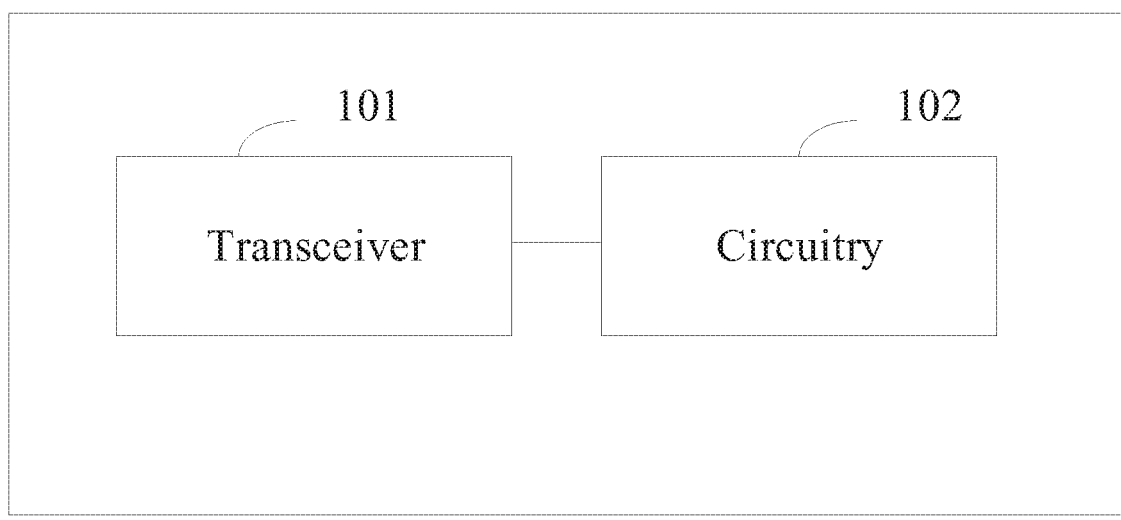
FIG. 1 schematically shows a block diagram of a user equipment (UE) according to a first embodiment of the present invention.

FIG. 1 schematically shows a block diagram of a user equipment (UE) 100 according to a first embodiment of the present invention.

The UE 100, at a first node, includes: a transceiver 101 operative to transmit and receive data to and from a second node; and a circuitry 102 operative to use at least a subcell identifier (ID) for physical layer behaviors. The subcell ID is assigned for UEs in a same subcell, and a cell is divided into subcells in different divisions of a type of domain.

Thus, because a cell can be divided into subcells in different divisions of a type of domain, (not only, or other than in different locations or physical areas), and how to divide a cell into subcells could be managed by base station for example by RRC configuration, the subcell division is more flexible.

Figure 2A:
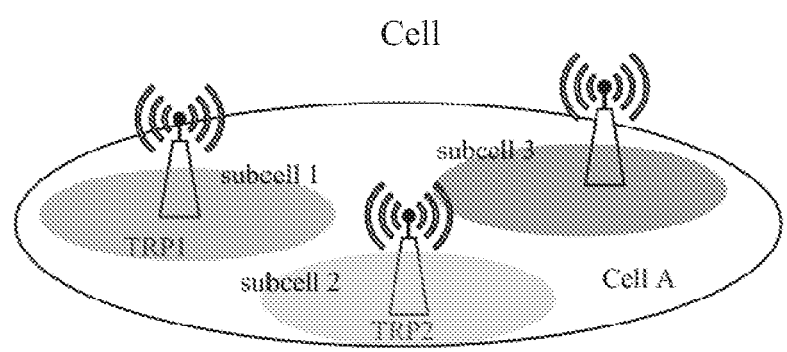
FIG. 2A schematically shows a concept diagram of sub-cells in a cell.

FIG. 2A schematically shows a concept diagram of subcells in a cell. As shown in FIG. 2A, the cell A can be divided into three subcells (subcell 1, subcell 2 and subcell 3) in different divisions of a type of domain. The subcell 1 can be managed by a transmission and reception point (TRP) 1, the subcell 2 can be managed by the TRP2, and the subcell 3 can be managed by the TRP3. TRP could be kind of remote radio unit (RRU).

Figure 2B:
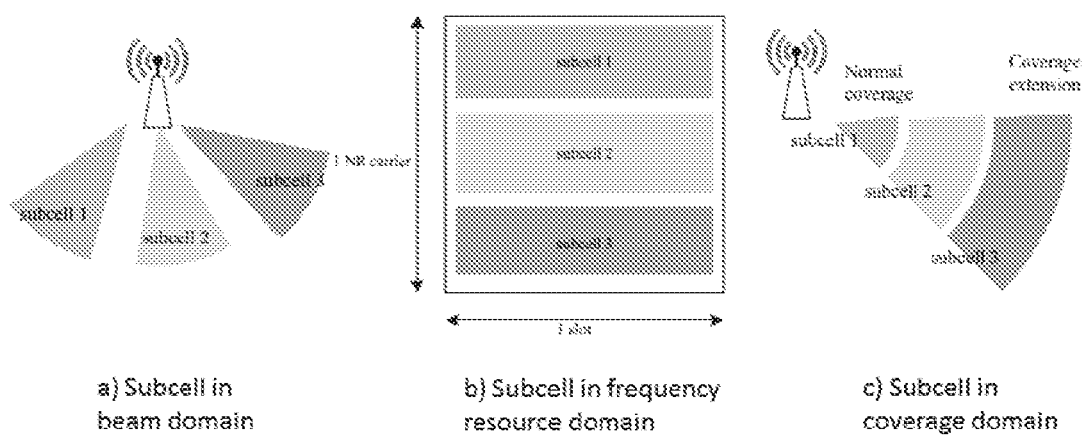
FIG. 2B schematically shows a concept diagram of sub-cells in different divisions of each of a first type of domain, a second type of domain and a third type of domain.

FIG. 2B schematically shows a concept diagram of subcells in different divisions of each of a first type of domain, a second type of domain and a third type of domain.

The first type of domain is wireless beam domain, and as seen from the left part of FIG. 2B, one cell can be divided into three subcells, i.e., subcell 1, subcell 2 and subcell 3 in different wireless beam domains. Since the wireless beam has a fan-like shape, each subcell may have a fan-like shape too.

The second type of domain is wireless frequency resource domain, and as seen from the middle part of FIG. 2B, one cell can be divided into three subcells, i.e., subcell 1, subcell 2 and subcell 3 in different frequency resources even in the same carrier in the same slot.

The third type of domain is coverage domain, and as seen from the right part of FIG. 2B, one cell can be divided into three subcells, i.e., subcell 1, subcell 2 and subcell 3 which covers different coverages. Each subcell may occupy different coverage areas, for example, normal coverage, extended coverage and so on.

But the above mentioned domains are only examples, and subcells can be realized in other domains.

And since the domain (in this embodiment, the type of domain may include at least one of wireless beam domain, wireless frequency resource domain, and wireless coverage domain) is not like static locations or areas, but can be dynamic, the subcell division can be more dynamic to meet UE's mobility, radio environment change and so on.

In an embodiment, the cell may be divided into the subcells based on configurations of system information transmitted by the cell (for example by a base station of the cell). So it is flexible to divide a cell into the subcells.

Due to the property of subcell and its' difference from the traditional cell division introduced above, there may be some new requirements on search space, RS and control channel design. Especially common search space shared by UEs in a subcell (it could be called as group common search space which is different from the traditional common search space shared by all UEs in a cell) may be a problem. How to configure group common search space (GCSS) of subcell and also solve the collision of GCSSs between subcells in a cell as well as subcells in different cells needs some considerations.

In current standard, in case of traditional cell division, Physical Cell Identity (PCI) assigned for a cell is used for traditional randomization of common search space, but it cannot be used for randomization of above-mentioned GCSS for subcells, because different subcells in one cell (or cell division) may have the same PCI, so there would be heavy interference or collisions among the subcells if PCI is still used for randomization of GCSS. UE-identifier (ID) is also not workable for randomization of GCSS, because GCSS needs to be shared by all the UEs in a subcell.

The similar problem exists for sequence generation of reference signal and scrambling among subcells.

In addition, there may be possibility that in the case of subcell, Cyclic Redundancy Check (CRC) size is increased for reducing error detection probability of Downlink Control Information (DCIs) due to shorter TTI length and dense deployment of subcells in New Radio (NR) (e.g., CRC is increased from 16 bits to 24 bits). In that case, how to mask CRC of DCI in NR would be a problem if legacy RNTI Radio Network Temporary Identity (RNTI) with 16 bits is used for masking CRC.

Thus, with the embodiment of the present disclosure, by using at least a subcell identifier (ID) assigned for each UE in one subcell to perform individual physical layer behaviors, there would be no or less interference or collisions among the different subcells.

In addition, the UEs in the same subcell can share a same group-common control channel or share a same group-common search space by using the subcell ID assigned for the same subcell, and meanwhile, the UEs in the same subcell can obtain system information still from the cell (i.e., the base station of the cell). Thus group common search space (GCSS) of subcell can be configured with the subcell ID, and the UEs in the same subcell can share a same group-common control channel or share a same group-common search space by using the subcell ID, while the UEs in the same subcell obtain system information from the cell to which the UEs belongs to, so as to save system resources and air interface overhead.

In an embodiment, the physical layer behaviors may include at least one of search space randomization, scrambling sequence and reference signal generation, and Cyclic Redundancy Check (CRC) masking.

In an embodiment, the physical layer behaviors may include initialization procedure in the at least one of search space randomization, reference signal generation, scrambling sequence generation, and Cyclic Redundancy Check (CRC) masking, of group-common control channel.

In an embodiment, the circuitry 102 may be operative to use a function of the subcell ID and a cell ID for the physical layer behaviors; or the circuitry 102 is operative to use the subcell ID for the physical layer behaviors.

In an embodiment, the cell ID may be Physical Cell Identity (PCI). But the cell ID is not limited to this, and other identities can be used.

In an embodiment, in the case that physical layer behaviors is Enhanced Physical Downlink Control Channel (EPD- CCH) based search space randomization, the traditional EPDCCH search space formula is as follows, $$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k}/L \rfloor \right\} + i, \quad \text{formula (1)}$$

where $Y_{p,k}$ is defined below, i=0, ..., L−1, b=$n_{CI}$ if the UE is configured with a carrier indicator field for the serving cell on which EPDCCH is monitored, otherwise b=0, $n_{CI}$ is the carrier indicator field value, m=0, 1, ... $M_p^{(L)}$−1, If the UE is not configured with a carrier indicator field for the serving cell on which EPDCCH is monitored, $M_p^{(L)}$ is the number of EPDCCH candidates to monitor at aggregation level L in Enhanced Physical Downlink Control Channel—physical resource block-set (EPDCCH-PRB-set) p for the serving cell on which EPDCCH is monitored; otherwise, $M_p^{(L)}$ is the number of EPDCCH candidates to monitor at aggregation level L in EPDCCH-PRB-set p for the serving cell indicated by $n_{CI}$.

If a UE is configured with higher layer parameter pdcch-candidateReductions for a specific search space at aggregation level L in EPDCCH-PRB-set p for a serving cell, the corresponding number of EPDCCH candidates is given by $M_p^{(L)}$=round(a×$M_{p,full}^{(L)}$), where the value of a is determined and $M_{p,full}^{(L)}$ is determined by replacing $M_p^{(L)}$ with $M_{p,full}^{(L)}$.

If a UE is configured with higher layer parameter cif-InSchedulingCell-r13, the carrier indicator field value corresponds to cif-nSchedulingCell-r13, otherwise the carrier indicator field value is the same as ServCellIndex.

A UE is not expected to monitor an EPDCCH candidate, if an Enhanced Control Channel Element (ECCE) corresponding to that EPDCCH candidate is mapped to a PRB pair that overlaps in frequency with a transmission of either PBCH or primary or secondary synchronization signals in the same subframe.

If a UE is configured with two EPDCCH-PRB-sets with the same $n_{ID,i}^{EPDCCH}$ value (where $n_{ID,i}^{EPDCCH}$ is defined in standard 3GPP TS36.213), if the UE receives an EPDCCH candidate with a given DCI payload size corresponding to one of the EPDCCH-PRB-sets and mapped only to a given set of Resource Elements (REs) (as described in standard 3GPP TS36.213), and if the UE is also configured to monitor an EPDCCH candidate with the same DCI payload size and corresponding to the other EPDCCH-PRB-set and which is mapped only to the same set of REs, and if the number of the first ECCE of the received EPDCCH candidate is used for determining Physical Uplink Control CHannel (PUCCH) resource for Hybrid Automatic Repeat reQuest-ACKnowledge (HARQ-ACK) transmission (as described in standard 3GPP TS36.213), the number of the first ECCE shall be determined based on EPDCCH-PRB-set p=0.

The variable $Y_{p,k}$ is defined by: $Y_{p,k}$=($A_p \cdot Y_{p,k-1}$)mod D and $Y_{p,-1}$=$n_{RNTI}$≠0, $A_0$=39827, $A_1$=39829, D=65537 and k=$\lfloor n_s/2 \rfloor$, $n_s$ is the slot number within a radio frame. The RNTI value used for $n_{RNTI}$ is defined in standard 3GPP TS36.213 in downlink and in uplink. The DCI formats that the UE shall monitor depend on the configured transmission mode per each serving cell as defined in standard 3GPP TS36.213. (More details could be obtained from section 9.1.4 EPDCCH assignment procedure of 3GPP TS36.213).

In this case, if only the UE specific RNTI is used for randomization of group-common control channel like above, different UEs cannot share the group-common search space. If PCI is used for randomization of group-common control channel, different subcells's group-common search spaces may collide as they may belong to the same cell and have the same PCI. In this case, search spaces of different subcells may collide in time/frequency domain and cause heavy interference to each other. So in this embodiment, the proposal is to consider at least subcell ID (for example, both the PCI and the subcell ID or only the subcell ID for randomization of group-common search space as follows.

The circuitry 102 is operative to: apply $Y_{p,-1}$=n_subcell+n_cell≠0 to initialization of the search space randomization; or apply $Y_{p,-1}$=n_cell×(2^(bit width of n_subcell))+n_subcell≠0 to initialization of the search space randomization; or apply $Y_{p,-1}$=n_subcell×(2^(bit width of n_cell))+n_cell≠0 to initialization of the search space randomization; or apply $Y_{p,-1}$=n_subcell≠0 to initialization of the search space randomization, wherein n_subcell indicates the subcell ID, and n_cell indicates the cell ID.

Of course, the above mentioned functions of the cell ID and the subcell ID (or only the subcell ID) are only examples, and the person skilled in the art may conceive other functions of the cell ID and the subcell ID (or only the subcell ID) for initialization of the search space randomization.

Thus, with the embodiment, there would be heavy interference or collisions among the subcells.

In the case of Physical Downlink Control Channel (PDCCH) based search space formulation, based on the current 3GPP TS36.213 standards, the search space formula is as follows (refer to 9.1.1 PDCCH assignment procedure, 3GPP TS36.213), The set of PDCCH candidates to monitor are defined in terms of search spaces, where a search space $S_k^{(L)}$ at aggregation level L∈{1,2,4,8} is defined by a set of PDCCH candidates. For each serving cell on which PDCCH is monitored, the CCEs corresponding to PDCCH candidate m of the search space $S_k^{(L)}$ are given by the below formula, $$L\{(Y_k+m')\bmod \lfloor N_{CCE,k}/L \rfloor\}+i \quad \text{where} \quad Y_k=(A \cdot Y_{k-1})\bmod D$$

where i=0, ..., L−1. For the common search space m'=m. For the PDCCH UE specific search space, for the serving cell on which PDCCH is monitored, if the monitoring UE is configured with carrier indicator field then m'=m+$M^{(L)} \cdot n_{CI}$ where $n_{CI}$ is the carrier indicator field value, else if the monitoring UE is not configured with carrier indicator field then m'=m, where m=0, ..., $M^{(L)}$−1. $M^{(L)}$ is the number of PDCCH candidates to monitor in the given search space.

where $Y_{-1}$=$n_{RNTI}$≠0, A=39827, D=65537 and k=$\lfloor n_s/2 \rfloor$.

Here, traditionally, the initialization of search space relies on UE-specific RNTI ($n_{RNTI}$), which cannot work for the subcell as UEs need to share the same group-common search space within the subcell. But at the same time, collisions of group-common search spaces within same cell or among different cells needs to be avoided.

So in the present embodiment, based on the proposals that subcell ID is used for search space randomization, the initialization of search space is as following options.

In the case that physical layer behavior is Physical Downlink Control channel (PDCCH) based search space randomization, the circuitry 102 is operative to: apply $Y_{-1}$=n_subcell+n_cell≠0 to initialization of the search space randomization; or apply $Y_{-1}$=n_cell×(2^(bit width of n_subcell))+n_subcell≠0 to initialization of the search space randomization; or apply $Y_{-1}$=n_subcell×(2^(bit width of n_cell))+n_cell≠0 to initialization of the search space randomization; or apply $Y_{-1}$=n_subcell≠0 to initialization of the search space randomization, wherein n_subcell indicates the subcell ID, and n_cell indicates the cell ID.

Here, in an option, both the cell ID (such as PCI) and the subcell ID are considered to avoid different collisions (from the same cell or different cells), and in another option, only the subcell ID may also work to void different collisions (from the same cell or different cells).

In a case of sequence initiation of reference signal (RS) for group common search space in a subcell, the CRS sequence generation formula is:

$$r_{l,n_s}(m) = \frac{1}{\sqrt{2}}(1 - 2 \cdot c(2m)) + j\frac{1}{\sqrt{2}}(1 - 2 \cdot c(2m + 1)),$$
$$m = 0, 1, \ldots, 2N_{RB}^{max,DL} - 1$$

In this case that physical layer behavior is the reference signal RS generation, the circuitry 102 is operative to: apply $c_{init}=2^{10} \cdot (7 \cdot (n'_s+1)+l+1) \cdot (2 \cdot (n_{subcell}+n_{cell})+1)+2(n_{subcell}+n_{cell})+N_{CP}$ to initialization of the reference signal generation, wherein $n_{subcell}$ indicates decimal value of the subcell ID, and $n_{cell}$ indicates decimal value of the cell ID, $n'_s$ is a slot number within a radio frame, and $$N_{CP} = \begin{cases} 1 & \text{for normal cyclic prefix} \\ 0 & \text{for extended cyclic prefix} \end{cases}.$$

Thus, in this embodiment, both the cell ID (such as PCI) and the subcell ID are considered to avoid different collisions (from the same cell or different cells) in sequence initiation of reference signal (RS) for group common search space in a subcell.

In a case of scrambling sequence generation of group-common search space in a subcell, a data scrambling formula for broadcast channel in legacy (refer to section 6.6 Physical broadcast channel in standard 3GPP 36.211) is taken as the assumption:

$$\tilde{b}(i)=(b(i)+c(i)) \bmod 2.$$

In particular, the block of bits $b(0), \ldots, b(M_{bit}-1)$, where $M_{bit}$, the number of bits transmitted on the physical broadcast channel, equals 1920 for normal cyclic prefix and 1728 for extended cyclic prefix, shall be scrambled with a cell-specific sequence prior to modulation, resulting in a block of scrambled bits $\tilde{b}(0), \ldots, \tilde{b}(M_{bit}-1)$ according to the above formula which is $\tilde{b}(i)=(b(i)+c(i)) \bmod 2$.

where the scrambling sequence c(i) is given by clause 7.2 of standard 3GPP 36.211. Traditionally, the scrambling sequence shall be initialized with $c_{init}=N_{ID}^{cell}$ (as described in section 6.6 Physical broadcast channel in standard 3GPP 36.211) in each radio frame fulfilling $n_f \bmod 4=0$.

Instead, in this embodiment, in this case that physical layer behavior is the scrambling sequence generation, the circuitry 102 is operative to: apply $c_{init}=N_{ID}^{cell}+N_{ID}^{subcell}$ to initialization of the scrambling sequence generation, wherein $N_{ID}^{subcell}$ indicates the subcell ID, and $N_{ID}^{cell}$ indicates the cell ID.

The benefit of above embodiments is that the behavior of group common control channel is clarified and the legacy protocol is used as much as possible to avoid too large modification. Also it can realize good resource/sequence reusing.

In a case of scrambling and/or RS generation of unicast data channel in a subcell, it is needed to avoid 1) collisions from different subcells in the same cell, 2) collisions from different subcells in the different cell, and 3) collisions from same subcell.

Only the traditional RNTI, only the PCI or only subcell ID may not solve all the three collisions. Therefore, all of RNTI, PCI and subcell ID are here combined together to generate scrambling and RS sequences of unicast channel.

Thus, in this case that physical layer behavior is the scrambling sequence generation and the reference signal generation of unicast data channel, the circuitry 102 is operative to: apply $c_{init}=n_{RNTI} \cdot 2^{14}+q \cdot 2^{13}+\lfloor n_s/2 \rfloor \cdot 2^9+N_{ID}^{cell}+N_{ID}^{subcell}$ to initialization of the scrambling sequence generation of unicast data channel; or apply $c_{init}=(\lfloor n_s/2 \rfloor+1) \cdot (2(N_{ID}^{cell}+N_{ID}^{subcell})+1) \cdot 2^{16}+n_{RNTI}$ to initialization of the reference signal generation of unicast data channel, wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and $q \in \{0,1\}$, in the case of single codeword transmission, q is equal to zero and otherwise it is equal to one.

Thus, with this embodiment, collisions from different subcells in the same cell, collisions from different subcells in the different cell, and collisions from same subcell can be avoided.

In a case of CRC mask of control channel in a subcell, Assuming CRC size is increased to 24 bits, subcell ID is X bits and RNTI is still 16 bits (same as current LTE), there are three cases: (1) in case Subcell ID is 8 bits, subcell ID plus legacy RNTI (e.g., C-RNTI) is used for CRC mask of control channel; (2) in case Subcell ID is smaller than 8 bits (X bits), (8−X) "zero" bits plus subcell ID plus legacy RNTI (e.g., C-RNTI) is used for CRC mask of control channel; and (3) in case Subcell ID is larger than 8 bits (X bits), 8 bits of LSB of subcell ID plus legacy RNTI (e.g., C-RNTI) is used for CRC mask of control channel.

That is, in the case that physical layer behavior is the CRC masking of control channel, the circuitry 102 is operative to: in the case that the number of the bits of the subcell ID is 8, apply the subcell ID plus a legacy Radio Network Temporary Identity (RNTI) for the CRC masking; in the case that the number of the bits of the subcell ID is X smaller than 8, apply (8−X) "zero" bits plus the subcell ID plus the legacy RNTI for the CRC masking; and in the case that the number of the bits of the subcell ID is Y larger than 8, apply 8 bits of Least Significant Bit (LSB) of the subcell ID plus the legacy RNTI for the CRC masking, wherein X and Y are positive integers, respectively.

The benefit of above embodiment is that: there is no need to increase RNTI size so legacy RNTI could be reused. It will also reduce Random Access Response (RAR) indication overhead and Radio Access Network (RAN)2 specification complexity.

Thus, with the embodiments of the present invention, the subcell division is more flexible, collisions from different subcells in the same cell, collisions from different subcells in the different cell, and collisions from same subcell can be avoided and the system resources and air interface overhead can be saved.

To be noted that the above formulas have several expressions for the subcell ID and the cell ID, for example, $N_{ID}^{subcell}$, $N_{ID}^{cell}$, $n_{subcell}$, $n_{cell}$, n_subcell, and n_cell. The different expressions are merely to match the same expressions in the standard, but they are not limitations, and can be exchangeable.

Figure 3:
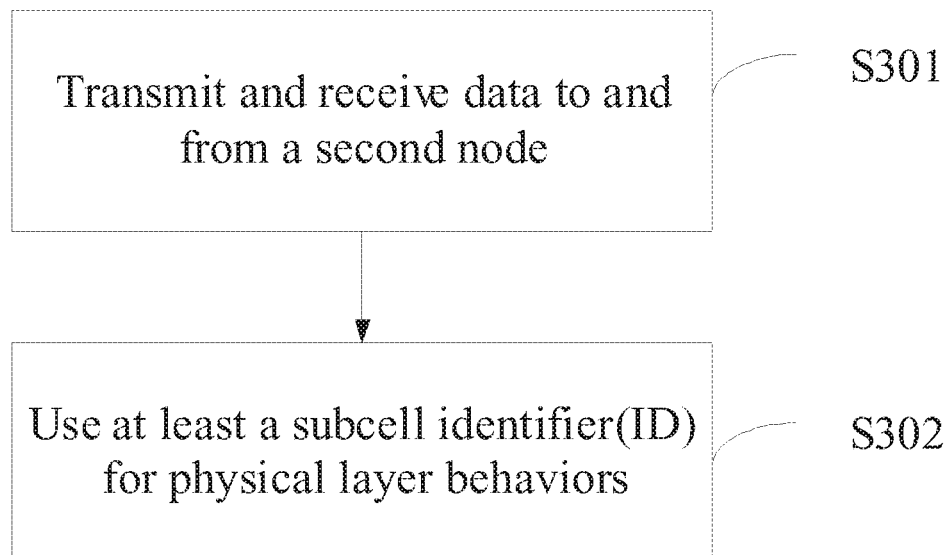
FIG. 3 schematically shows a flowchart of a method for a UE according to a second embodiment of the present invention.

FIG. 3 schematically shows a flowchart of a method 300 for a UE according to a second embodiment of the present invention.

The method for a user equipment (UE) 300, at a first node, comprises: step S 301, transmitting and receiving data to and from a second node; and step S302, using at least a subcell identifier (ID) for physical layer behaviors, wherein the subcell ID is assigned for UEs in a same subcell, and a cell is divided into subcells in different divisions of a type of domain.

In an embodiment, the type of domain may include at least one of wireless beam domain, wireless frequency resource domain, and wireless coverage domain.

In an embodiment, the cell may be divided into the subcells based on configurations of system information transmitted by the cell.

In an embodiment, the UEs in the same subcell may share a same group-common control channel or share a same group-common search space by using the subcell ID, and the UEs in the same subcell may obtain system information from the cell.

In an embodiment, the physical layer behaviors may include at least one of search space randomization, scrambling sequence and reference signal generation, and Cyclic Redundancy Check (CRC) masking.

In an embodiment, the physical layer behaviors may include initialization procedure in the at least one of search space randomization, reference signal generation, scrambling sequence generation, and Cyclic Redundancy Check (CRC) masking, of group-common control channel.

In an embodiment, the circuitry may be operative to use a function of the subcell ID and a cell ID for the physical layer behaviors; or the circuitry may be operative to use the subcell ID for the physical layer behaviors.

In an embodiment the cell ID may be Physical Cell Identity (PCI).

In an embodiment, in the case that physical layer behaviors is Enhanced Physical Downlink Control Channel (EPDCCH) based search space randomization, the circuitry may be operative to: apply $Y_{p,-1}$=n_subcell+n_cell≠0 to initialization of the search space randomization; or apply $Y_{p,-1}$=n_cell×(2^(bit width of n_subcell))+n_subcell≠0 to initialization of the search space randomization; or apply $Y_{p,-1}$=n_subcell×(2^(bit width of n_cell))+n_cell≠0 to initialization of the search space randomization; or apply $Y_{p,-1}$=n_subcell≠0 to initialization of the search space randomization, wherein n_subcell indicates the subcell ID, and n_cell indicates the cell ID.

In an embodiment, in the case that physical layer behavior is Physical Downlink Control channel (PDCCH) based search space randomization, the circuitry may be operative to: apply $Y_{-1}$=n_subcell+n_cell≠0 to initialization of the search space randomization; or apply $Y_{-1}$=n_cell×(2^(bit width of n_subcell))+n_subcell≠0 to initialization of the search space randomization; or apply $Y_{-1}$=n_subcell×(2^(bit width of n_cell))+n_cell≠0 to initialization of the search space randomization; or apply $Y_{-1}$=n_subcell≠0 to initialization of the search space randomization, wherein n_subcell indicates the subcell ID, and n_cell indicates the cell ID.

In an embodiment, in the case that physical layer behavior is the reference signal generation, the circuitry is operative to: apply $c_{init}=2^{10} \cdot (7 \cdot (n'_s+1)+l+1) \cdot (2 \cdot (n_{subcell}+n_{cell})+1)+2 \cdot (n_{subcell}+n_{cell})+N_{CP}$ to initialization of the reference signal generation, wherein $n_{subcell}$ indicates decimal value of the subcell ID, and $n_{cell}$ indicates decimal value of the cell ID, $n'_s$ is a slot number within a radio frame, and $$N_{CP} = \begin{cases} 1 & \text{for normal cyclic prefix} \\ 0 & \text{for extended cyclic prefix} \end{cases}.$$

In an embodiment, in the case that physical layer behavior is the scrambling sequence generation, the circuitry may be operative to: apply $c_{init}=N_{ID}^{cell}+N_{ID}^{subcell}$ to initialization of the scrambling sequence generation, wherein $N_{ID}^{subcell}$ indicates the subcell ID, and $N_{ID}^{cell}$ indicates the cell ID.

In an embodiment, in the case that physical layer behavior is the scrambling sequence generation and the reference signal generation of unicast data channel, the circuitry may be operative to: apply $c_{init}=n_{RNTI} \cdot 2^{14}+q \cdot 2^{13}+\lfloor n_s/2 \rfloor 2^9 + N_{ID}^{cell}+N_{ID}^{subcell}$ to initialization of the scrambling sequence generation of unicast data channel; or apply $c_{init}=(\lfloor n_s/2 \rfloor+1) \cdot (2(N_{ID}^{cell}+N_{ID}^{subcell})+1) \cdot 2^{16}+n_{RNTI}$ to initialization of the reference signal generation of unicast data channel, wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and q∈{0,1}, in the case of single codeword transmission, q is equal to zero and otherwise it is equal to one.

In an embodiment, in the case that physical layer behavior is the CRC masking of control channel, the circuitry may be operative to: in the case that the number of the bits of the subcell ID is 8, apply the subcell ID plus a legacy Radio Network Temporary Identity (RNTI) for the CRC masking; in the case that the number of the bits of the subcell ID is X smaller than 8, apply (8−X) "zero" bits plus the subcell ID plus the legacy RNTI for the CRC masking; and in the case that the number of the bits of the subcell ID is Y larger than 8, apply 8 bits of Least Significant Bit (LSB) of the subcell ID plus the legacy RNTI for the CRC masking, wherein X and Y are positive integers, respectively.

Thus, with the embodiments of the present invention, the subcell division is more flexible, collisions from different subcells in the same cell, collisions from different subcells in the different cell, and collisions from same subcell can be avoided and the system resources and air interface overhead can be saved.

Figure 4:
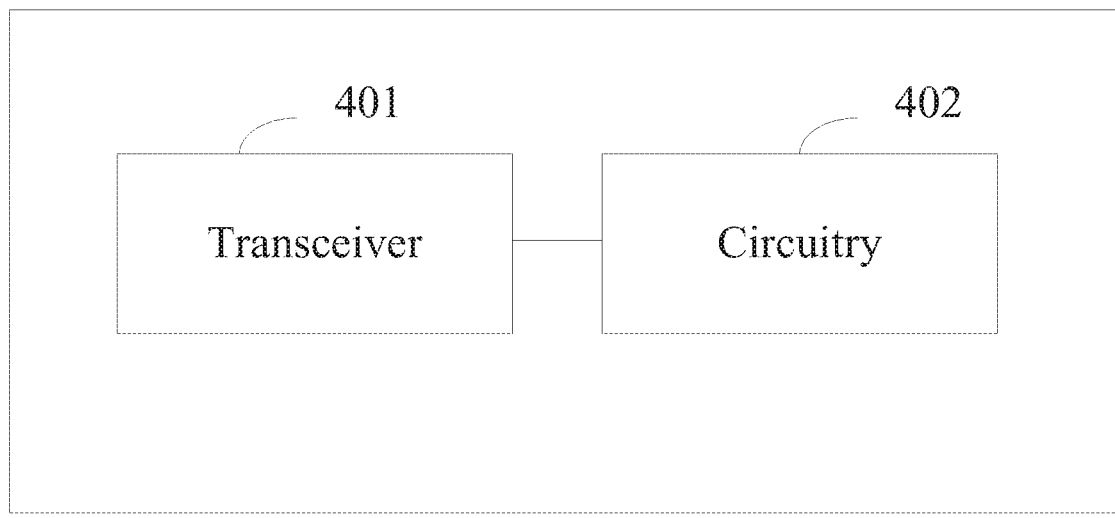
FIG. 4 schematically shows a block diagram of a base station (BS) according to a third embodiment of the present invention.

FIG. 4 schematically shows a block diagram of a base station (BS) 400 according to a third embodiment of the present invention.

The base station 400 comprises: a transceiver 401 operative to transmit and receive data to and from user equipments; and a circuitry 402 operative to divide a cell into subcells in different divisions of a type of domain, wherein a subcell identifier (ID) is assigned for user equipments (UEs) in a same subcell, and at least a subcell ID is used for physical layer behaviors at UEs.

In an embodiment, the type of domain may include at least one of wireless beam domain, wireless frequency resource domain, and wireless coverage domain.

In an embodiment, the circuitry may be operative to divide the cell into the subcells based on configurations of system information transmitted by the cell.

In an embodiment, the UEs in the same subcell may share a same group-common control channel or share a same group-common search space by using the subcell ID, and the UEs in the same subcell obtain system information from the cell.

In an embodiment, the physical layer behaviors may include at least one of search space randomization, scrambling sequence and reference signal generation, and Cyclic Redundancy Check (CRC) masking.

In an embodiment, the physical layer behaviors may include initialization procedure in the at least one of search space randomization, reference signal generation, scrambling sequence generation, and Cyclic Redundancy Check (CRC) masking, of group-common control channel.

In an embodiment, a function of the subcell ID and a cell ID may be used for the physical layer behaviors; or the subcell ID may be used for the physical layer behaviors.

In an embodiment, the cell ID may be Physical Cell Identity (PCI).

In an embodiment, in the case that physical layer behaviors is Enhanced Physical Downlink Control Channel (EPDCCH) based search space randomization, the at least a subcell ID may be used for physical layer behaviors at UEs by: applying $Y_{p,-1}=\text{n\_subcell}+\text{n\_cell}\neq 0$ to initialization of the search space randomization; or applying $Y_{p,-1}=\text{n\_cell}\times(2^{\wedge}(\text{bit width of n\_subcell}))+\text{n\_subcell}\neq 0$ to initialization of the search space randomization; or applying $Y_{p,-1}=\text{n\_subcell}\times(2^{\wedge}(\text{bit width of n\_cell}))+\text{n\_cell}\neq 0$ to initialization of the search space randomization; or applying $Y_{p,-1}=\text{n\_subcell}\neq 0$ to initialization of the search space randomization, wherein n_subcell indicates the subcell ID, and n_cell indicates the cell ID.

In an embodiment, in the case that physical layer behavior is Physical Downlink Control channel (PDCCH) based search space randomization, the at least a subcell ID may be used for physical layer behaviors at UEs by: applying $Y_{-1}=\text{n\_subcell}+\text{n\_cell}\neq 0$ to initialization of the search space randomization; or applying $Y_{-1}=\text{n\_cell}\times(2^{\wedge}(\text{bit width of n\_subcell}))+\text{n\_subcell}\neq 0$ to initialization of the search space randomization; or applying $Y_{-1}=\text{n\_subcell}\times(2^{\wedge}(\text{bit width of n\_cell}))+\text{n\_cell}\neq 0$ to initialization of the search space randomization; or applying $Y_{-1}=\text{n\_subcell}\neq 0$ to initialization of the search space randomization, wherein n_subcell indicates the subcell ID, and n_cell indicates the cell ID.

In an embodiment, in the case that physical layer behavior is the reference signal generation, the at least a subcell ID may be used for physical layer behaviors at UEs by: applying $c_{init}=2^{10}\cdot(7\cdot(n'_s+1)+1+1)\cdot(2\cdot(n_{subcell}+n_{cell})+1)+2\cdot(n_{subcell}+n_{cell})+N_{CP}$ to initialization of the reference signal generation, wherein $n_{subcell}$ indicates decimal value of the subcell ID, and $n_{cell}$ indicates decimal value of the cell ID, $n'_s$ is a slot number within a radio frame, and $$N_{CP} = \begin{cases} 1 & \text{for normal cyclic prefix} \\ 0 & \text{for extended cyclic prefix} \end{cases}.$$

In an embodiment, in the case that physical layer behavior is the scrambling sequence generation, the at least a subcell ID may be used for physical layer behaviors at UEs by: applying $c_{init}=N_{ID}^{cell}+N_{ID}^{subcell}$ to initialization of the scrambling sequence generation, wherein $N_{ID}^{subcell}$ indicates the subcell ID, and $N_{ID}^{cell}$ indicates the cell ID.

In an embodiment, in the case that physical layer behavior is the scrambling sequence generation and the reference signal generation of unicast data channel, the at least a subcell ID may be used for physical layer behaviors at UEs by: applying $c_{init}=n_{RNTI}\cdot2^{14}+q\cdot2^{13}+\lfloor n_s/2\rfloor\cdot2^9+N_{ID}^{cell}+N_{ID}^{subcell}$ to initialization of the scrambling sequence generation of unicast data channel; or applying $c_{init}=(\lfloor n_s/2\rfloor+1)\cdot(2(N_{ID}^{cell}+N_{ID}^{subcell})+1)\cdot2^{16}+n_{RNTI}$ to initialization of the reference signal generation of unicast data channel, wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and $q\in\{0,1\}$, in the case of single codeword transmission, q is equal to zero and otherwise it is equal to one.

In an embodiment, in the case that physical layer behavior is the CRC masking of control channel, the at least a subcell ID may be used for physical layer behaviors at UEs by: in the case that the number of the bits of the subcell ID is 8, applying the subcell ID plus a legacy Radio Network Temporary Identity (RNTI) for the CRC masking; in the case that the number of the bits of the subcell ID is X smaller than 8, applying (8−X) "zero" bits plus the subcell ID plus the legacy RNTI for the CRC masking; and in the case that the number of the bits of the subcell ID is Y larger than 8, applying 8 bits of Least Significant Bit (LSB) of the subcell ID plus the legacy RNTI for the CRC masking, wherein X and Y are positive integers, respectively.

Thus, with the embodiments of the present invention, the subcell division is more flexible, collisions from different subcells in the same cell, collisions from different subcells in the different cell, and collisions from same subcell can be avoided and the system resources and air interface overhead can be saved.

To be noted that the base station 400 can communication with the user equipment 100 as shown in FIG. 1.

Figure 5:
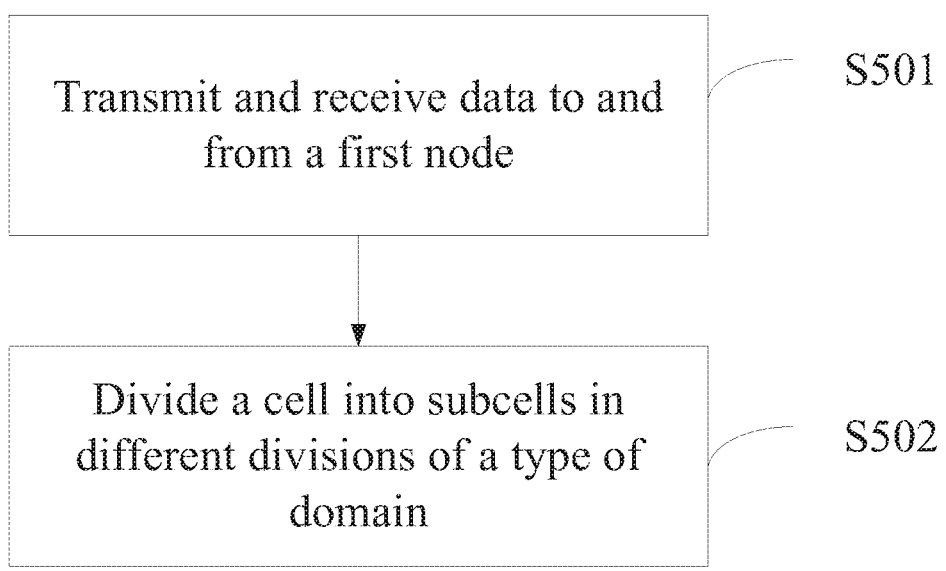
FIG. 5 schematically shows a flowchart of a method for a BS according to a fourth embodiment of the present invention.

FIG. 5 schematically shows a flowchart of a method for a BS according to a fourth embodiment of the present invention.

The method for a base station comprises: step S501, transmitting and receiving data to and from user equipments; and Step S502, dividing a cell into subcells in different divisions of a type of domain, wherein a subcell identifier (ID) is assigned for user equipments (UEs) in a same subcell, and at least a subcell ID is used for physical layer behaviors at UEs.

In an embodiment, the type of domain may include at least one of wireless beam domain, wireless frequency resource domain, and wireless coverage domain.

In an embodiment, the dividing step may divide the cell into the subcells based on configurations of system information transmitted by the cell.

In an embodiment, the UEs in the same subcell may share a same group-common control channel or share a same group-common search space by using the subcell ID, and the UEs in the same subcell obtain system information from the cell.

In an embodiment, the physical layer behaviors may include at least one of search space randomization, scrambling sequence and reference signal generation, and Cyclic Redundancy Check (CRC) masking.

In an embodiment, the physical layer behaviors may include initialization procedure in the at least one of search space randomization, reference signal generation, scrambling sequence generation, and Cyclic Redundancy Check (CRC) masking, of group-common control channel.

a function of the subcell ID and a cell ID may be used for the physical layer behaviors; or the subcell ID may be used for the physical layer behaviors.

In an embodiment, the cell ID may be Physical Cell Identity (PCI).

In an embodiment, in the case that physical layer behaviors is Enhanced Physical Downlink Control Channel (EPDCCH) based search space randomization, the at least a subcell ID may be used for physical layer behaviors at UEs by: applying $Y_{p,-1}=\text{n\_subcell}+\text{n\_cell}\neq 0$ to initialization of the search space randomization; or applying $Y_{p,-1}=\text{n\_cell}\times(2^{\wedge}(\text{bit width of n\_subcell}))+\text{n\_subcell}\neq 0$ to initialization of the search space randomization; or applying $Y_{p,-1}=\text{n\_sub-}$ cell×(2^(bit width of n_cell))+n_cell≠0 to initialization of the search space randomization; or applying $Y_{p,-1}$=n_subcell≠0 to initialization of the search space randomization, wherein n_subcell indicates the subcell ID, and n_cell indicates the cell ID.

In an embodiment, in the case that physical layer behavior is Physical Downlink Control channel (PDCCH) based search space randomization, the at least a subcell ID may be used for physical layer behaviors at UEs by: applying $Y_{-1}$=n_subcell+n_cell≠0 to initialization of the search space randomization; or applying $Y_{-1}$=n_cell×(2^(bit width of n_subcell))+n_subcell≠0 to initialization of the search space randomization; or applying $Y_{-1}$=n_subcell×(2^(bit width of n_cell))+n_cell≠0 to initialization of the search space randomization; or applying $Y_{-1}$=n_subcell≠0 to initialization of the search space randomization, wherein n_subcell indicates the subcell ID, and n_cell indicates the cell ID.

In an embodiment, in the case that physical layer behavior is the reference signal generation, the at least a subcell ID may be used for physical layer behaviors at UEs by: applying $c_{init}=2^{10} \cdot (7 \cdot (n'_s+1)+l+1) \cdot (2 \cdot (n_{subcell}+n_{cell})+1) + 2 \cdot (n_{subcell}+n_{cell})+N_{CP}$ to initialization of the reference signal generation, wherein $n_{subcell}$ indicates decimal value of the subcell ID, and $n_{cell}$ indicates decimal value of the cell ID, $n'_s$ is a slot number within a radio frame, and $$N_{CP} = \begin{cases} 1 & \text{for normal cyclic prefix} \\ 0 & \text{for extended cyclic prefix} \end{cases}.$$

In an embodiment, in the case that physical layer behavior is the scrambling sequence generation, the at least a subcell ID may be used for physical layer behaviors at UEs by: applying $c_{init}=N_{ID}^{cell}+N_{ID}^{subcell}$ to initialization of the scrambling sequence generation, wherein $N_{ID}^{subcell}$ indicates the subcell ID, and $N_{ID}^{cell}$ indicates the cell ID.

In an embodiment, in the case that physical layer behavior is the scrambling sequence generation and the reference signal generation of unicast data channel, the at least a subcell ID may be used for physical layer behaviors at UEs by: applying $c_{init}=n_{RNTI} \cdot 2^{14}+q \cdot 2^{13}+\lfloor n_s/2 \rfloor \cdot 2^9 + N_{ID}^{cell}+N_{ID}^{subcell}$ to initialization of the scrambling sequence generation of unicast data channel; or applying $c_{init}=(\lfloor n_s/2 \rfloor+1) \cdot (2(N_{ID}^{cell}+N_{ID}^{subcell})+1) \cdot 2^{16}+n_{RNTI}$ to initialization of the reference signal generation of unicast data channel, wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and q∈{0.1}, in the case of single codeword transmission, q is equal to zero and otherwise it is equal to one.

In an embodiment, in the case that physical layer behavior is the CRC masking of control channel, the at least a subcell ID may be used for physical layer behaviors at UEs by: in the case that the number of the bits of the subcell ID is 8, applying the subcell ID plus a legacy Radio Network Temporary Identity (RNTI) for the CRC masking; in the case that the number of the bits of the subcell ID is X smaller than 8, applying (8−X) "zero" bits plus the subcell ID plus the legacy RNTI for the CRC masking; and in the case that the number of the bits of the subcell ID is Y larger than 8, applying 8 bits of Least Significant Bit (LSB) of the subcell ID plus the legacy RNTI for the CRC masking, wherein X and Y are positive integers, respectively.

Thus, with the embodiments of the present invention, the subcell division is more flexible, collisions from different subcells in the same cell, collisions from different subcells in the different cell, and collisions from same subcell can be avoided and the system resources and air interface overhead can be saved.

Figure 6:
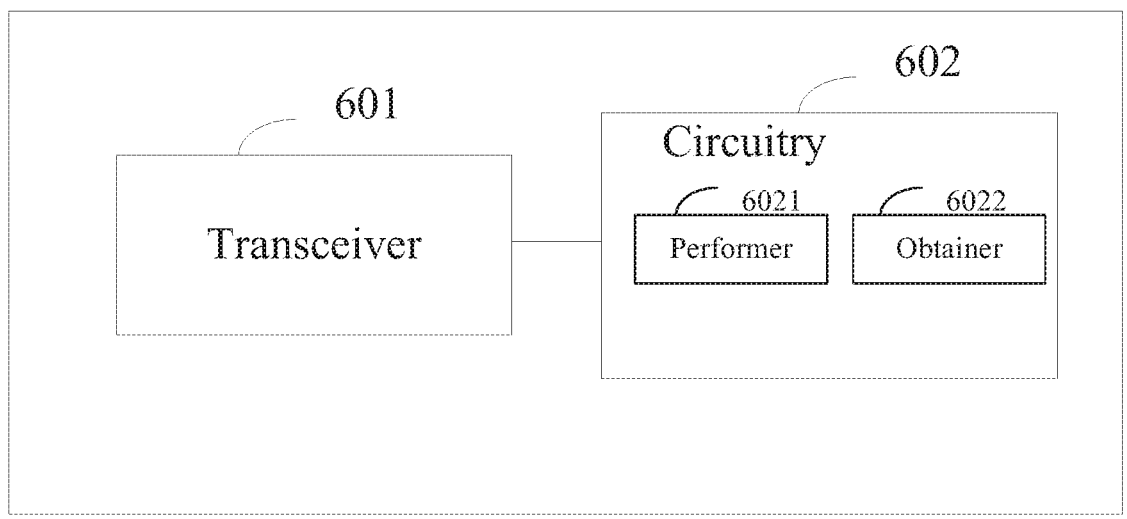
FIG. 6 schematically shows a block diagram of a UE according to a fifth embodiment of the present invention.

FIG. 6 schematically shows a block diagram of a UE according to a fifth embodiment of the present invention.

The user equipment (UE) 600 in a cell comprises: a transceiver 601 operative to transmit and receive data to and from a second node; and a circuitry 602 operative to perform a subcell ID obtaining operation, wherein the subcell ID is assigned for UEs in a same subcell, and the cell is divided into subcells in different divisions of a type of domain, wherein the circuitry 602 includes: a performer 6021 operative to perform random access configurations by making the transceiver receive random access configuration signals in system information blocks (SIBs); and an obtainer 6022 operative to obtain the subcell ID if any one of the random access configurations is successful, wherein the subcell ID is related with a sequential order of the successful random access configuration.

Thus, the subcell ID can be obtained from SIB and Random Access Channel (RACH) procedure instead of Primary Synchronization Signal/Secondary Synchronization Signal (PSS/SSS). So no additional/new signal needs to be further used in obtaining the subcell ID obtaining operation, and the system complexity can be reduced.

In an embodiment, the subcell ID may be the sequential order of the successful random access configuration or a function of the sequential order of the successful random access configuration. For example, if the sequential order is of the successful random access configuration is the $1^{st}$, the subcell ID may be 1 or 0 (i.e., the sequential order −1), or other functions of the sequential order of the successful random access configuration. Thus, just the sequential order of the successful random access configuration is reused, but no additional/new signal needs to be further used in obtaining the subcell ID obtaining operation, and the system complexity can be reduced.

In an embodiment, the random access configuration signals in the SIBs may include: Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . }, Subcell_1 {selection criteria of this subcell, PRACH related configuration, RAR configuration(including RS), group search configuration, possibility of PCFICH related configuration, . . . }, and . . . Subcell_n {selection criteria of this subcell, PRACH related configuration, RAR configuration (including RS), group search configuration, possibility of PCFICH related configuration, . . . }, wherein n is a positive integer.

As such, the UE obtains the subcell ID if a certain above random access procedure is successful, and for example if the above third procedure succeeds, the sub-cell ID is 2. Thus, just the sequential order of the successful random access configuration is reused, but no additional/new signal needs to be further used in obtaining the subcell ID obtaining operation, and the system complexity can be reduced.

In an embodiment, the transceiver 601 may receive all the random access configuration signals in the SIBs. For example, a cell common SIB indicates all subcell's information. Thus, each UE's transceiver may receive all the random access configuration signals in the SIBs to determine which random access configuration is successful.

In an embodiment, the transceiver receives a part of the random access configuration signals in the SIBs. For example, a cell specific SIB indicates subcell group specific SIB based on some metrics like repetition levels. For example cell specific SIB indicates subcell group specific SIB A (which has small repetitions) and subcell group specific SIB B (which has large repetitions), so the UE in a subcell group may receive specific SIB A (small repetitions), and some other UEs in another subcell group may receive subcell group specific SIB B (which has large repetitions). Thus, the air interface overhead and the system resources can be further saved.

Figure 7:
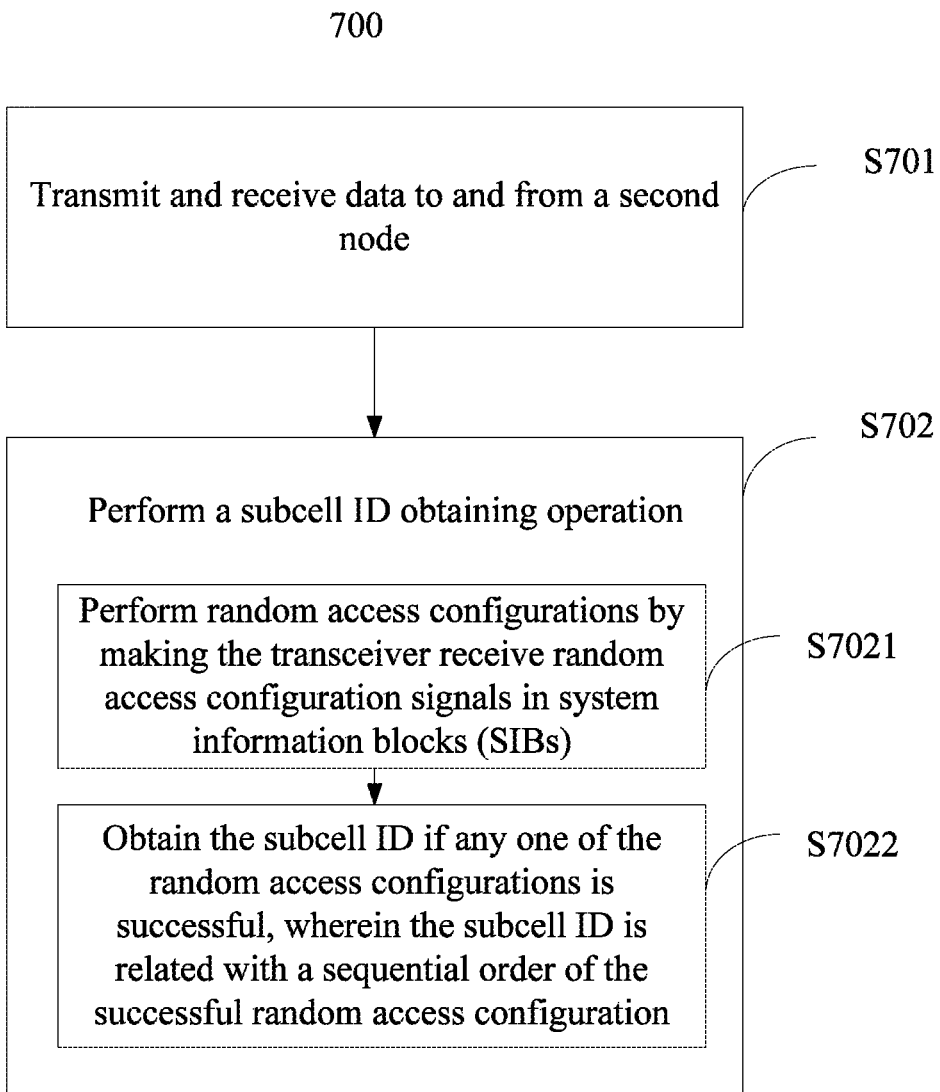
FIG. 7 schematically shows a flowchart of a method for a UE according to a sixth embodiment of the present invention.

FIG. 7 schematically shows a flowchart of a method 700 for a UE according to a sixth embodiment of the present invention.

The method 700 for a user equipment (UE) in a cell comprises: step S701, transmitting and receiving data to and from a second node; and step S702, performing a subcell ID obtaining operation, wherein the subcell ID is assigned for UEs in a same subcell, and the cell is divided into subcells in different divisions of a type of domain, wherein the subcell ID obtaining operation includes steps of: step S7021, performing random access configurations by making the transceiver receive random access configuration signals in system information blocks (SIBs); and step S7022, obtaining the subcell ID if any one of the random access configurations is successful, wherein the subcell ID is related with a sequential order of the successful random access configuration.

In an embodiment, the subcell ID may be the sequential order of the successful random access configuration or a function of the sequential order of the successful random access configuration.

In an embodiment, the random access configuration signals in the SIBs may include: Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . }, Subcell_1 {selection criteria of this subcell, PRACH related configuration, RAR configuration(including RS), group search configuration, possibility of PCFICH related configuration, . . . }, and . . . Subcell_n {selection criteria of this subcell, PRACH related configuration, RAR configuration (including RS), group search configuration, possibility of PCFICH related configuration, . . . }, wherein n is a positive integer.

In an embodiment, the receiving step may receive all the random access configuration signals in the SIBs.

In an embodiment, the receiving step may receive a part of the random access configuration signals in the SIBs.

Thus, just the sequential order of the successful random access configuration is reused, but no additional/new signal needs to be further used in obtaining the subcell ID obtaining operation, and the system complexity can be reduced.

Figure 8:
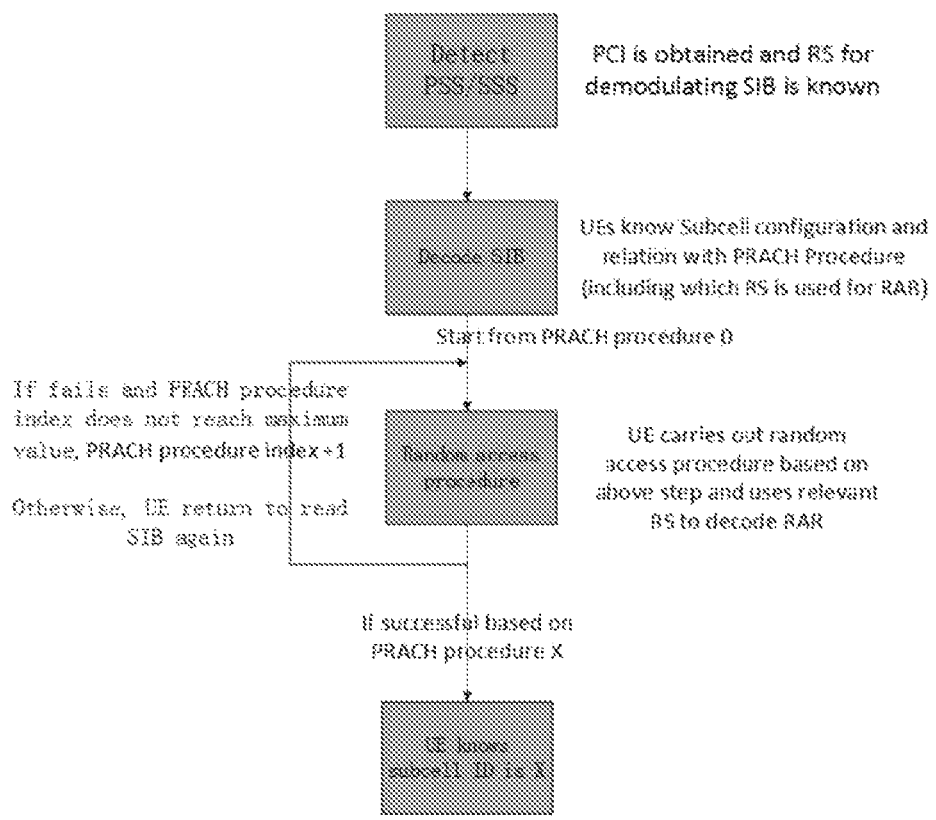
FIG. 8 schematically shows a flowchart of another detailed method for a UE according to the sixth embodiment of the present invention.

FIG. 8 schematically shows a flowchart of another detailed method 800 for a UE according to the sixth embodiment of the present invention.

In this embodiment, there are two options on detailed indication of subcell information in SIB, Option 1: Cell common SIB indicates all subcell's information.

Option 2: Cell specific SIB indicates subcell group specific SIB based on some metrics like repetition levels. For example cell specific SIB indicates subcell group specific SIB A (small repetitions) and subcell group specific SIB B (large repetitions).

Thus, the air interface overhead and the system resources can be further saved.

Figure 9:
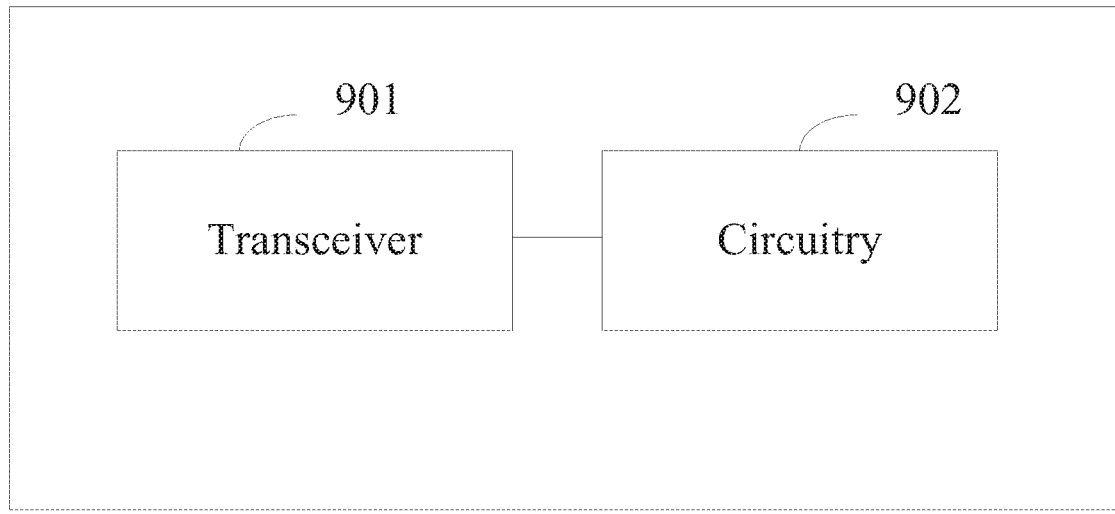
FIG. 9 schematically shows a block diagram of a BS according to a seventh embodiment of the present invention.

FIG. 9 schematically shows a block diagram of a BS 900 according to a seventh embodiment of the present invention.

The base station 900 comprises: a transceiver 901 operative to transmit and receive data to and from user equipments (UEs); and a circuitry 902 operative to divide a cell into subcells in different divisions of a type of domain, and make the transceiver transmit random access configuration signals in system information blocks (SIBs) to the UEs for random access configurations, wherein the subcell ID is assigned for UEs in a same subcell, and the subcell ID is assigned to a UE if any one of the random access configurations at the UE is successful, wherein the subcell ID is related with a sequential order of the successful random access configuration.

In an embodiment, the subcell ID may be the sequential order of the successful random access configuration or a function of the sequential order of the successful random access configuration.

In an embodiment, the random access configuration signals in the SIBs may include: Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . }, Subcell_1 {selection criteria of this subcell, PRACH related configuration, RAR configuration(including RS), group search configuration, possibility of PCFICH related configuration, . . . }, and . . . Subcell_n {selection criteria of this subcell, PRACH related configuration, RAR configuration (including RS), group search configuration, possibility of PCFICH related configuration, . . . }, wherein n is a positive integer.

In an embodiment, the circuitry may be operative to make the transceiver transmit all the random access configuration signals in the SIBs to all the UEs in the cell.

In an embodiment, the circuitry may be operative to make the transceiver transmit a part of the random access configuration signals in the SIBs to a part of the UEs in the cell, and transmit another part of the random access configuration signals in the SIBs to another part of the UEs in the cell.

Thus, just the sequential order of the successful random access configuration is reused, but no additional/new signal needs to be further used in obtaining the subcell ID obtaining operation, and the system complexity can be reduced.

To be noted that, the BS 900 can communicate with the UE 600.

Figure 10:
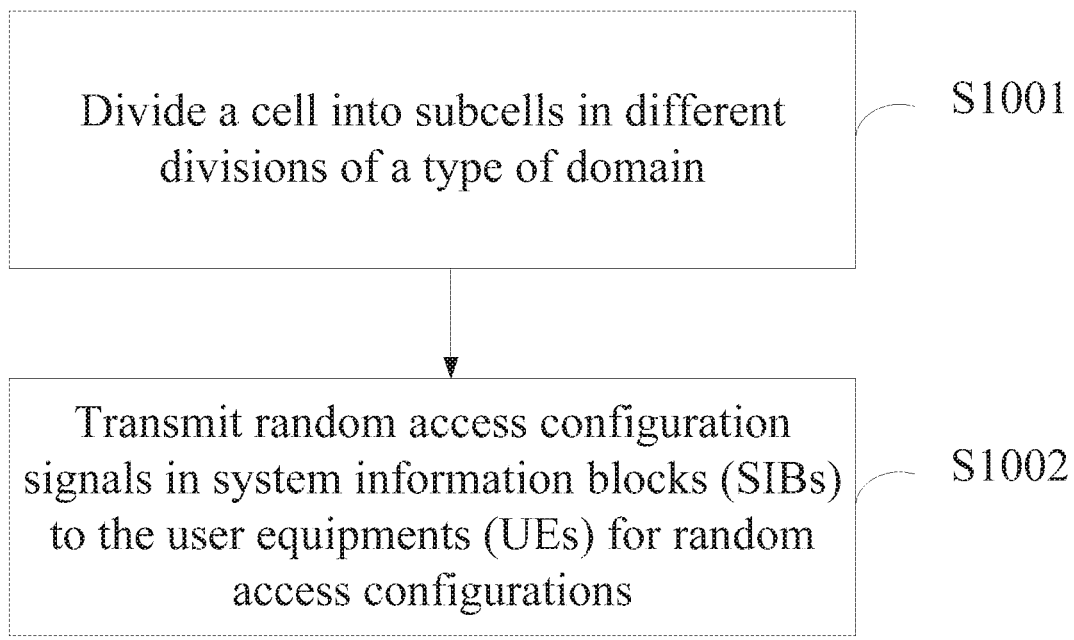
FIG. 10 schematically shows a flowchart of a method for a BS according to an eighth embodiment of the present invention.

FIG. 10 schematically shows a flowchart of a method 1000 for a BS according to an eighth embodiment of the present invention.

The method 1000 for a base station, comprises: step S1001, dividing a cell into subcells in different divisions of a type of domain, and step S1002, transmitting random access configuration signals in system information blocks (SIBs) to the user equipments (UEs) for random access configurations, wherein the subcell ID is assigned for UEs in a same subcell, and the subcell ID is assigned to a UE if any one of the random access configurations at the UE is successful, wherein the subcell ID is related with a sequential order of the successful random access configuration.

In an embodiment, the subcell ID may be the sequential order of the successful random access configuration or a function of the sequential order of the successful random access configuration.

In an embodiment, the random access configuration signals in the SIBs may include: Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . }, Subcell_1 {selection criteria of this subcell, PRACH related configuration, RAR configuration(including RS), group search configuration, possibility of PCFICH related configuration, . . . }, and . . . Subcell_n {selection criteria of this subcell, PRACH related configuration, RAR configuration (including RS), group search configuration, possibility of PCFICH related configuration, . . . }, wherein n is a positive integer.

In an embodiment, the transmitting step S1002 may include transmitting all the random access configuration signals in the SIBs to all the UEs in the cell.

In an embodiment, the transmitting step S1002 may include transmitting a part of the random access configuration signals in the SIBs to a part of the UEs in the cell, and transmitting another part of the random access configuration signals in the SIBs to another part of the UEs in the cell.

Thus, just the sequential order of the successful random access configuration is reused, but no additional/new signal needs to be further used in obtaining the subcell ID obtaining operation, and the system complexity can be reduced.

In addition, embodiments of the present disclosure can at least provide the following subject matters.

(1) A user equipment (UE), at a first node, comprising:
a transceiver operative to transmit and receive data to and from a second node; and
a circuitry operative to use at least a subcell identifier (ID) for physical layer behaviors,
wherein the subcell ID is assigned for UEs in a same subcell, and a cell is divided into subcells in different divisions of a type of domain.

(2) The user equipment according to (1), wherein, the type of domain includes at least one of wireless beam domain, wireless frequency resource domain, and wireless coverage domain.

(3) The user equipment according to (1), wherein, the cell is divided into the subcells based on configurations of system information transmitted by the cell.

(4) The user equipment according to (1), wherein, the UEs in the same subcell share a same group-common control channel or share a same group-common search space by using the subcell ID, and the UEs in the same subcell obtain system information from the cell.

(5) The user equipment according to (1), wherein, the physical layer behaviors include at least one of search space randomization, scrambling sequence and reference signal generation, and Cyclic Redundancy Check (CRC) masking.

(6) The user equipment according to (5), wherein, the physical layer behaviors include initialization procedure in the at least one of search space randomization, reference signal generation, scrambling sequence generation, and Cyclic Redundancy Check (CRC) masking, of group-common control channel.

(7) The user equipment according to (5) or (6), wherein, the circuitry is operative to use a function of the subcell ID and a cell ID for the physical layer behaviors; or the circuitry is operative to use the subcell ID for the physical layer behaviors.

(8) The user equipment according to (7), wherein the cell ID is Physical Cell Identity (PCI).

(9) The user equipment according to (7), wherein,
in the case that physical layer behaviors is Enhanced Physical Downlink Control Channel (EPDCCH) based search space randomization, the circuitry is operative to:
apply $Y_{p,-1}=\text{n\_subcell}+\text{n\_cell} \neq 0$ to initialization of the search space randomization; or
apply $Y_{p,-1}=\text{n\_cell} \times (2^{\wedge}(\text{bit width of n\_subcell}))+\text{n\_subcell} \neq 0$ to initialization of the search space randomization; or
apply $Y_{p,-1}=\text{n\_subcell} \times (2^{\wedge}(\text{bit width of n\_cell}))+\text{n\_cell} \neq 0$ to initialization of the search space randomization; or
apply $Y_{p,-1}=\text{n\_subcell} \neq 0$ to initialization of the search space randomization,
wherein n_subcell indicates the subcell ID, and n_cell indicates the cell ID.

(10) The user equipment according to (7), wherein,
in the case that physical layer behavior is Physical Downlink Control channel (PDCCH) based search space randomization, the circuitry is operative to:
apply $Y_{-1}=\text{n\_subcell}+\text{n\_cell} \neq 0$ to initialization of the search space randomization; or
apply $Y_{-1}=\text{n\_cell} \times (2^{\wedge}(\text{bit width of n\_subcell}))+\text{n\_subcell} \neq 0$ to initialization of the search space randomization; or
apply $Y_{-1}=\text{n\_subcell} \times (2^{\wedge}(\text{bit width of n\_cell}))+\text{n\_cell} \neq 0$ to initialization of the search space randomization; or
apply $Y_{-1}=\text{n\_subcell} \neq 0$ to initialization of the search space randomization,
wherein n_subcell indicates the subcell ID, and n_cell indicates the cell ID.

(10) The user equipment according to (7), wherein,
in the case that physical layer behavior is the reference signal generation, the circuitry is operative to:
apply $c_{init}=2^{10} \cdot (7 \cdot (n'_s+1)+l+1) \cdot (2 \cdot (n_{subcell}+n_{cell})+1)+2 \cdot (n_{subcell}+n_{cell})+N_{CP}$ to initialization of the reference signal generation,
wherein $n_{subcell}$ indicates decimal value of the subcell ID, and $n_{cell}$ indicates decimal value of the cell ID, $n'_s$ is a slot number within a radio frame, and $$N_{CP} = \begin{cases} 1 & \text{for normal cyclic prefix} \\ 0 & \text{for extended cyclic prefix} \end{cases}.$$

(11) The user equipment according to (7), wherein,
in the case that physical layer behavior is the scrambling sequence generation, the circuitry is operative to:
apply $c_{init}=N_{ID}^{cell}+N_{ID}^{subcell}$ to initialization of the scrambling sequence generation,
wherein $N_{ID}^{subcell}$ indicates the subcell ID, and $N_{ID}^{cell}$ indicates the cell ID.

(12) The user equipment according to (7), wherein,
in the case that physical layer behavior is the scrambling sequence generation and the reference signal generation of unicast data channel, the circuitry is operative to:
apply $c_{init}=n_{RNTI} \cdot 2^{14}+q \cdot 2^{13}+\lfloor n_s/2 \rfloor \cdot 2^9+N_{ID}^{cell}+N_{ID}^{subcell}$ to initialization of the scrambling sequence generation of unicast data channel; or apply $c_{init}=(\lfloor n_s/2 \rfloor+1)\cdot(2(N_{ID}^{cell}+N_{ID}^{subcell})+1)\cdot2^{16}+n_{RNTI}$ to initialization of the reference signal generation of unicast data channel, wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and $q \in \{0,1\}$, in the case of single codeword transmission, q is equal to zero and otherwise it is equal to one.

(13) The user equipment according to (7), wherein,
in the case that physical layer behavior is the CRC masking of control channel, the circuitry is operative to:
in the case that the number of the bits of the subcell ID is 8, apply the subcell ID plus a legacy Radio Network Temporary Identity (RNTI) for the CRC masking;
in the case that the number of the bits of the subcell ID is X smaller than 8, apply (8−X) "zero" bits plus the subcell ID plus the legacy RNTI for the CRC masking; and
in the case that the number of the bits of the subcell ID is Y larger than 8, apply 8 bits of Least Significant Bit (LSB) of the subcell ID plus the legacy RNTI for the CRC masking,
wherein X and Y are positive integers, respectively.

(14) A method for a user equipment (UE), at a first node, comprising:
transmitting and receiving data to and from a second node; and
using at least a subcell identifier (ID) for physical layer behaviors,
wherein the subcell ID is assigned for UEs in a same subcell, and a cell is divided into subcells in different divisions of a type of domain.

(15) The method according to (14), wherein, the type of domain includes at least one of wireless beam domain, wireless frequency resource domain, and wireless coverage domain.

(16) The method according to (14), wherein, the cell is divided into the subcells based on configurations of system information transmitted by the cell.

(17) The method according to (14), wherein, the UEs in the same subcell share a same group-common control channel or share a same group-common search space by using the subcell ID, and the UEs in the same subcell obtain system information from the cell.

(18) The method according to (14), wherein, the physical layer behaviors include at least one of search space randomization, scrambling sequence and reference signal generation, and Cyclic Redundancy Check (CRC) masking.

(19) The method according to (18), wherein, the physical layer behaviors include initialization procedure in the at least one of search space randomization, reference signal generation, scrambling sequence generation, and Cyclic Redundancy Check (CRC) masking, of group-common control channel.

(20) The method according to (18) or (19), wherein, the circuitry is operative to use a function of the subcell ID and a cell ID for the physical layer behaviors; or
the circuitry is operative to use the subcell ID for the physical layer behaviors.

(21) The method according to (20), wherein the cell ID is Physical Cell Identity (PCI).

(22) The method according to (20), wherein,
in the case that physical layer behaviors is Enhanced Physical Downlink Control Channel (EPDCCH) based search space randomization, the circuitry is operative to:
apply $Y_{p,-1}=\text{n\_subcell}+\text{n\_cell}\neq 0$ to initialization of the search space randomization; or
apply $Y_{p,-1}=\text{n\_cell}\times(2^{\wedge}(\text{bit width of n\_subcell}))+\text{n\_subcell}\neq 0$ to initialization of the search space randomization; or
apply $Y_{p,-1}=\text{n\_subcell}\times(2^{\wedge}(\text{bit width of n\_cell}))+\text{n\_cell}\neq 0$ to initialization of the search space randomization; or
apply $Y_{p,-1}=\text{n\_subcell}\neq 0$ to initialization of the search space randomization,
wherein n_subcell indicates the subcell ID, and n_cell indicates the cell ID.

(23) The method according to (20), wherein,
in the case that physical layer behavior is Physical Downlink Control channel (PDCCH) based search space randomization, the circuitry is operative to:
apply $Y_{-1}=\text{n\_subcell}+\text{n\_cell}\neq 0$ to initialization of the search space randomization; or
apply $Y_{-1}=\text{n\_cell}\times(2^{\wedge}(\text{bit width of n\_subcell}))+\text{n\_subcell}\neq 0$ to initialization of the search space randomization; or
apply $Y_{-1}=\text{n\_subcell}\times(2^{\wedge}(\text{bit width of n\_cell}))+\text{n\_cell}\neq 0$ to initialization of the search space randomization; or
apply $Y_{-1}=\text{n\_subcell}\neq 0$ to initialization of the search space randomization,
wherein n_subcell indicates the subcell ID, and n_cell indicates the cell ID.

(24) The method according to (20), wherein,
in the case that physical layer behavior is the reference signal generation, the circuitry is operative to:
apply $c_{init}=2^{10}\cdot(7\cdot(n'_s+1)+l+1)\cdot(2\cdot(n_{subcell}+n_{cell})+1)+2\cdot(n_{subcell}+n_{cell})+N_{CP}$ to initialization of the reference signal generation,
wherein $n_{subcell}$ indicates decimal value of the subcell ID, and $n_{cell}$ indicates decimal value of the cell ID, $n'_s$ is a slot number within a radio frame, and for normal cyclic prefix $$N_{CP} = \begin{cases} 1 & \text{for normal cyclic prefix} \\ 0 & \text{for extended cyclic prefix} \end{cases}.$$

(25) The method according to (20), wherein,
in the case that physical layer behavior is the scrambling sequence generation, the circuitry is operative to:
apply $c_{init}=N_{ID}^{cell}+N_{ID}^{subcell}$ to initialization of the scrambling sequence generation,
wherein $N_{ID}^{subcell}$ indicates the subcell ID, and $N_{ID}^{cell}$ indicates the cell ID.

(26) The method according to (20), wherein,
in the case that physical layer behavior is the scrambling sequence generation and the reference signal generation of unicast data channel, the circuitry is operative to:
apply $c_{init}=n_{RNTI}\cdot2^{14}+q\cdot2^{13}+\lfloor n_s/2 \rfloor\cdot2^9+N_{ID}^{cell}+N_{ID}^{subcell}$ to initialization of the scrambling sequence generation of unicast data channel; or
apply $c_{init}=(\lfloor n_s/2 \rfloor+1)\cdot(2(N_{ID}^{cell}+N_{ID}^{subcell})+1)\cdot2^{16}+n_{RNTI}$ to initialization of the reference signal generation of unicast data channel,
wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and q∈{0,1}, in the case of single codeword transmission, q is equal to zero and otherwise it is equal to one.

(27) The method according to (20), wherein,
in the case that physical layer behavior is the CRC masking of control channel, the circuitry is operative to:
in the case that the number of the bits of the subcell ID is 8, apply the subcell ID plus a legacy Radio Network Temporary Identity (RNTI) for the CRC masking;
in the case that the number of the bits of the subcell ID is X smaller than 8, apply (8−X) "zero" bits plus the subcell ID plus the legacy RNTI for the CRC masking; and
in the case that the number of the bits of the subcell ID is Y larger than 8, apply 8 bits of Least Significant Bit (LSB) of the subcell ID plus the legacy RNTI for the CRC masking,
wherein X and Y are positive integers, respectively.

(28) A base station, comprising:
a transceiver operative to transmit and receive data to and from user equipments; and
a circuitry operative to divide a cell into subcells in different divisions of a type of domain,
wherein a subcell identifier (ID) is assigned for user equipments (UEs) in a same subcell, and at least a subcell ID is used for physical layer behaviors at UEs.

(29) The base station according to (28), wherein, the type of domain includes at least one of wireless beam domain, wireless frequency resource domain, and wireless coverage domain.

(30) The base station according to (28), wherein, the circuitry is operative to divide the cell into the subcells based on configurations of system information transmitted by the cell.

(31) The base station according to claim (28), wherein, the UEs in the same subcell share a same group-common control channel or share a same group-common search space by using the subcell ID, and the UEs in the same subcell obtain system information from the cell.

(32) The base station according to (28), wherein, the physical layer behaviors include at least one of search space randomization, scrambling sequence and reference signal generation, and Cyclic Redundancy Check (CRC) masking.

(33) The base station according to (32), wherein, the physical layer behaviors include initialization procedure in the at least one of search space randomization, reference signal generation, scrambling sequence generation, and Cyclic Redundancy Check (CRC) masking, of group-common control channel.

(34) The base station according to (32) or (33), wherein, a function of the subcell ID and a cell ID are used for the physical layer behaviors; or
the subcell ID is used for the physical layer behaviors.

(35) The base station according to (34), wherein the cell ID is Physical Cell Identity (PCI).

(36) The base station according to (34), wherein,
in the case that physical layer behaviors is Enhanced Physical Downlink Control Channel (EPDCCH) based search space randomization, the at least a subcell ID is used for physical layer behaviors at UEs by:
applying $Y_{p,-1}$=n_subcell+n_cell≠0 to initialization of the search space randomization; or
applying $Y_{p,-1}$=n_cell×(2^(bit width of n_subcell))+n_subcell≠0 to initialization of the search space randomization; or
applying $Y_{p,-1}$=n_subcell×(2^(bit width of n_cell))+n_cell≠0 to initialization of the search space randomization; or
applying $Y_{p,-1}$=n_subcell≠0 to initialization of the search space randomization,
wherein n_subcell indicates the subcell ID, and n_cell indicates the cell ID.

(37) The base station according to (34), wherein,
in the case that physical layer behavior is Physical Downlink Control channel (PDCCH) based search space randomization, the at least a subcell ID is used for physical layer behaviors at UEs by:
applying $Y_{-1}$=n_subcell+n_cell≠0 to initialization of the search space randomization; or
applying $Y_{-1}$=n_cell×(2^(bit width of n_subcell))+n_subcell≠0 to initialization of the search space randomization; or
applying $Y_{-1}$=n_subcell×(2^(bit width of n_cell))+n_cell≠0 to initialization of the search space randomization; or
applying $Y_{-1}$=n_subcell≠0 to initialization of the search space randomization,
wherein n_subcell indicates the subcell ID, and n_cell indicates the cell ID.

(38) The base station according to (34), wherein,
in the case that physical layer behavior is the reference signal generation, the at least a subcell ID is used for physical layer behaviors at UEs by:
applying $c_{init}=2^{10} \cdot (7 \cdot (n'_s+1)+l+1) \cdot (2 \cdot (n_{subcell}+n_{cell})+1)+2 \cdot (n_{subcell}+n_{cell})+N_{CP}$ to initialization of the reference signal generation,
wherein $n_{subcell}$ indicates decimal value of the subcell ID, and $n_{cell}$ indicates decimal value of the cell ID, $n'_s$ is a slot number within a radio frame, and $$N_{CP} = \begin{cases} 1 & \text{for normal cyclic prefix} \\ 0 & \text{for extended cyclic prefix} \end{cases}.$$

(39) The base station according to (34), wherein,
in the case that physical layer behavior is the scrambling sequence generation, the at least a subcell ID is used for physical layer behaviors at UEs by:
applying $c_{init}=N_{ID}^{cell}+N_{ID}^{subcell}$ to initialization of the scrambling sequence generation,
wherein $N_{ID}^{subcell}$ indicates the subcell ID, and $N_{ID}^{cell}$ indicates the cell ID.

(40) The base station according to (34), wherein,
in the case that physical layer behavior is the scrambling sequence generation and the reference signal generation of unicast data channel, the at least a subcell ID is used for physical layer behaviors at UEs by:
applying $c_{init}=n_{RNTI} \cdot 2^{14}+q \cdot 2^{13}+\lfloor n_s/2 \rfloor \cdot 2^9+N_{ID}^{cell}+N_{ID}^{subcell}$ to initialization of the scrambling sequence generation of unicast data channel; or
applying $c_{init}=(\lfloor n_s/2 \rfloor+1) \cdot (2(N_{ID}^{cell}+N_{ID}^{subcell})+1) \cdot 2^{16}+n_{RNTI}$ to initialization of the reference signal generation of unicast data channel,
wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and q∈{0,1}, in the case of single codeword transmission, q is equal to zero and otherwise it is equal to one.

(41) The base station according to (34), wherein,
in the case that physical layer behavior is the CRC masking of control channel, the at least a subcell ID is used for physical layer behaviors at UEs by:
in the case that the number of the bits of the subcell ID is 8, applying the subcell ID plus a legacy Radio Network Temporary Identity (RNTI) for the CRC masking;
in the case that the number of the bits of the subcell ID is X smaller than 8, applying (8–X) "zero" bits plus the subcell ID plus the legacy RNTI for the CRC masking; and
in the case that the number of the bits of the subcell ID is Y larger than 8, applying 8 bits of Least Significant Bit (LSB) of the subcell ID plus the legacy RNTI for the CRC masking,
wherein X and Y are positive integers, respectively.

(42) A method for a base station, comprising:
transmitting and receiving data to and from user equipments; and
dividing a cell into subcells in different divisions of a type of domain,
wherein a subcell identifier (ID) is assigned for user equipments (UEs) in a same subcell, and at least a subcell ID is used for physical layer behaviors at UEs.

(43) The method according to (42), wherein, the type of domain includes at least one of wireless beam domain, wireless frequency resource domain, and wireless coverage domain.

(44) The method according to (42), wherein, the dividing step divides the cell into the subcells based on configurations of system information transmitted by the cell.

(45) The method according to (42), wherein, the UEs in the same subcell share a same group-common control channel or share a same group-common search space by using the subcell ID, and the UEs in the same subcell obtain system information from the cell.

(46) The method according to (42), wherein, the physical layer behaviors include at least one of search space randomization, scrambling sequence and reference signal generation, and Cyclic Redundancy Check (CRC) masking.

(47) The method according to (46), wherein, the physical layer behaviors include initialization procedure in the at least one of search space randomization, reference signal generation, scrambling sequence generation, and Cyclic Redundancy Check (CRC) masking, of group-common control channel.

(48) The method according to (46) or (47), wherein, a function of the subcell ID and a cell ID are used for the physical layer behaviors; or
the subcell ID is used for the physical layer behaviors.

(49) The method according to (48), wherein the cell ID is Physical Cell Identity (PCI).

(50) The method according to (48), wherein,
in the case that physical layer behaviors is Enhanced Physical Downlink Control Channel (EPDCCH) based search space randomization, the at least a subcell ID is used for physical layer behaviors at UEs by:
applying $Y_{p,-1}$=n_subcell+n_cell≠0 to initialization of the search space randomization; or
applying $Y_{p,-1}$=n_cell×(2^(bit width of n_subcell))+n_subcell≠0 to initialization of the search space randomization; or
applying $Y_{p,-1}$=n_subcell×(2^(bit width of n_cell))+n_cell≠0 to initialization of the search space randomization; or
applying $Y_{p,-1}$=n_subcell≠0 to initialization of the search space randomization,
wherein n_subcell indicates the subcell ID, and n_cell indicates the cell ID.

(51) The method according to (48), wherein,
in the case that physical layer behavior is Physical Downlink Control channel (PDCCH) based search space randomization, the at least a subcell ID is used for physical layer behaviors at UEs by:
applying $Y_{-1}$=n_subcell+n_cell≠0 to initialization of the search space randomization; or
applying $Y_{-1}$=n_cell×(2^(bit width of n_subcell))+n_subcell≠0 to initialization of the search space randomization; or
applying $Y_{-1}$=n_subcell×(2^(bit width of n_cell))+n_cell≠0 to initialization of the search space randomization; or
applying $Y_1$=n_subcell≠0 to initialization of the search space randomization,
wherein n_subcell indicates the subcell ID, and n_cell indicates the cell ID.

(52) The method according to (48), wherein,
in the case that physical layer behavior is the reference signal generation, the at least a subcell ID is used for physical layer behaviors at UEs by:
applying $c_{init}=2^{10} \cdot (7 \cdot (n'_s+1)+l+1) \cdot (2 \cdot (n_{subcell}+n_{cell})+1)+2(n_{subcell}+n_{cell})+N_{CP}$ to initialization of the reference signal generation,
wherein $n_{subcell}$ indicates decimal value of the subcell ID, and $n_{cell}$ indicates decimal value of the cell ID, $n'_s$ is a slot number within a radio frame, and $$N_{CP} = \begin{cases} 1 & \text{for normal cyclic prefix} \\ 0 & \text{for extended cyclic prefix} \end{cases}.$$

(53) The method according to (48), wherein,
in the case that physical layer behavior is the scrambling sequence generation, the at least a subcell ID is used for physical layer behaviors at UEs by:
applying $c_{init}=N_{ID}^{cell}+N_{ID}^{subcell}$ to initialization of the scrambling sequence generation,
wherein $N_{ID}^{subcell}$ indicates the subcell ID, and $N_{ID}^{cell}$ indicates the cell ID.

(54) The method according to (48), wherein,
in the case that physical layer behavior is the scrambling sequence generation and the reference signal generation of unicast data channel, the at least a subcell ID is used for physical layer behaviors at UEs by:
applying $c_{init}=n_{RNTI} \cdot 2^{14}+q \cdot 2^{13}+\lfloor n_s/2 \rfloor \cdot 2^9+N_{ID}^{cell}+N_{ID}^{subcell}$ to initialization of the scrambling sequence generation of unicast data channel; or
applying $c_{init}=(\lfloor n_s/2 \rfloor+1) \cdot (2(N_{ID}^{cell}+N_{ID}^{subcell})+1) \cdot 2^{16}+n_{RNTI}$ to initialization of the reference signal generation of unicast data channel,
wherein $N_{ID}^{subcell}$ indicates the subcell ID, and $N_{ID}^{cell}$ indicates the cell ID, $n_{RNTI}$ is a Cell-Radio Network Temporary Identifier (C-RNTI), $n_s$ is a slot number within a radio frame, and q is related with a codeword number, and q∈{0,1}, in the case of single codeword transmission, q is equal to zero and otherwise it is equal to one.

(55) The method according to (48), wherein,
in the case that physical layer behavior is the CRC masking of control channel, the at least a subcell ID is used for physical layer behaviors at UEs by:
in the case that the number of the bits of the subcell ID is 8, applying the subcell ID plus a legacy Radio Network Temporary Identity (RNTI) for the CRC masking;
in the case that the number of the bits of the subcell ID is X smaller than 8, applying (8−X) "zero" bits plus the subcell ID plus the legacy RNTI for the CRC masking; and
in the case that the number of the bits of the subcell ID is Y larger than 8, applying 8 bits of Least Significant Bit (LSB) of the subcell ID plus the legacy RNTI for the CRC masking,
wherein X and Y are positive integers, respectively.

(60) A user equipment (UE) in a cell, comprising:
a transceiver operative to transmit and receive data to and from a second node; and
a circuitry operative to perform a subcell ID obtaining operation, wherein the subcell ID is assigned for UEs in a same subcell, and the cell is divided into subcells in different divisions of a type of domain,
wherein the circuitry includes:
  a performer operative to perform random access configurations by making the transceiver receive random access configuration signals in system information blocks (SIBs); and
  an obtainer operative to obtain the subcell ID if any one of the random access configurations is successful, wherein the subcell ID is related with a sequential order of the successful random access configuration.

(61) The UE according to (60), wherein, the subcell ID is the sequential order of the successful random access configuration or a function of the sequential order of the successful random access configuration.

(62) The UE according to (60), wherein, the random access configuration signals in the SIBs include:
Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . },
Subcell_1 {selection criteria of this subcell, PRACH related configuration, RAR configuration(including RS), group search configuration, possibility of PCFICH related configuration, . . . }, and
. . .
Subcell_n {selection criteria of this subcell, PRACH related configuration, RAR configuration(including RS), group search configuration, possibility of PCFICH related configuration, . . . },
wherein n is a positive integer.

(63) The UE according to (60), wherein, the transceiver receives all the random access configuration signals in the SIBs.

(64) The UE according to (60), wherein, the transceiver receives a part of the random access configuration signals in the SIBs.

(65) A method for a user equipment (UE) in a cell, comprising:
transmitting and receiving data to and from a second node; and
performing a subcell ID obtaining operation, wherein the subcell ID is assigned for UEs in a same subcell, and the cell is divided into subcells in different divisions of a type of domain,
wherein the subcell ID obtaining operation includes steps of:
  performing random access configurations by making the transceiver receive random access configuration signals in system information blocks (SIBs); and
  obtaining the subcell ID if any one of the random access configurations is successful, wherein the subcell ID is related with a sequential order of the successful random access configuration.

(66) The method according to (65), wherein, the subcell ID is the sequential order of the successful random access configuration or a function of the sequential order of the successful random access configuration.

(67) The method according to (65), wherein, the random access configuration signals in the SIBs include:
Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . },
Subcell_1 {selection criteria of this subcell. PRACH related configuration, RAR configuration(including RS), group search configuration, possibility of PCFICH related configuration, . . . }, and
. . .
Subcell_n {selection criteria of this subcell, PRACH related configuration, RAR configuration(including RS), group search configuration, possibility of PCFICH related configuration, . . . },
wherein n is a positive integer.

(68) The method according to (65), wherein, the receiving step receives all the random access configuration signals in the SIBs.

(69) The method according to (65), wherein, the receiving step receives a part of the random access configuration signals in the SIBs.

(70) A base station, comprising:
a transceiver operative to transmit and receive data to and from user equipments (UEs); and
a circuitry operative to divide a cell into subcells in different divisions of a type of domain, and make the transceiver transmit random access configuration signals in system information blocks (SIBs) to the UEs for random access configurations,
wherein the subcell ID is assigned for UEs in a same subcell, and the subcell ID is assigned to a UE if any one of the random access configurations at the UE is successful, wherein the subcell ID is related with a sequential order of the successful random access configuration.

(71) The base station according to (70), wherein, the subcell ID is the sequential order of the successful random access configuration or a function of the sequential order of the successful random access configuration.

(72) The base station according to (70), wherein, the random access configuration signals in the SIBs include:
Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . },
Subcell_1 {selection criteria of this subcell, PRACH related configuration, RAR configuration(including RS), group search configuration, possibility of PCFICH related configuration, . . . }, and
. . .
Subcell_n {selection criteria of this subcell, PRACH related configuration, RAR configuration(including RS), group search configuration, possibility of PCFICH related configuration . . . }.
wherein n is a positive integer.
(73) The base station according to (70), wherein, the circuitry is operative to make the transceiver transmit all the random access configuration signals in the SIBs to all the UEs in the cell.
(74) The base station according to (70), wherein, the circuitry is operative to make the transceiver transmit a part of the random access configuration signals in the SIBs to a part of the UEs in the cell, and transmit another part of the random access configuration signals in the SIBs to another part of the UEs in the cell.
(75) A method for a base station, comprising:
dividing a cell into subcells in different divisions of a type of domain, and
transmitting random access configuration signals in system information blocks (SIBs) to the user equipments (UEs) for random access configurations,
wherein the subcell ID is assigned for UEs in a same subcell, and the subcell ID is assigned to a UE if any one of the random access configurations at the UE is successful, wherein the subcell ID is related with a sequential order of the successful random access configuration.
(76) The method according to (75), wherein, the subcell ID is the sequential order of the successful random access configuration or a function of the sequential order of the successful random access configuration.
(77) The method according to (75), wherein, the random access configuration signals in the SIBs include:
Subcell_0 {selection criteria of this subcell, Physical Random Access Channel (PRACH) related configuration, Random Access Response (RAR) configuration (including Reference Signal (RS)), group search configuration, possibility of Physical Control Format Indicator Channel (PCFICH) related configuration, . . . },
Subcell_1 {selection criteria of this subcell, PRACH related configuration, RAR configuration(including RS), group search configuration, possibility of PCFICH related configuration, . . . }, and
. . .
Subcell_n {selection criteria of this subcell, PRACH related configuration, RAR configuration(including RS), group search configuration, possibility of PCFICH related configuration, . . . },
wherein n is a positive integer.
(78) The method according to (75), wherein, the transmitting step includes transmitting all the random access configuration signals in the SIBs to all the UEs in the cell.
(79) The UE according to (75), wherein, the transmitting step includes transmitting a part of the random access configuration signals in the SIBs to a part of the UEs in the cell, and transmitting another part of the random access configuration signals in the SIBs to another part of the UEs in the cell.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

Examples of several embodiments of the present disclosure have been described in detail above, with reference to the attached illustrations of specific embodiments. Because it is not possible, of course, to describe every conceivable combination of components or techniques, those skilled in the art will appreciate that various modifications may be made to the above described embodiments without departing from the scope of the present disclosure. For example, it will be readily appreciated that although the above embodiments are described with reference to parts of a The 3rd Generation Partnership Project (3GPP) network, an embodiment of the present disclosure will also be applicable to like networks, such as a successor of the 3GPP network, having like functional components.

Therefore, in particular, the terms 3GPP and associated or related terms used in the above description and in the enclosed drawings and any appended claims now or in the future are to be interpreted accordingly.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Notably, modifications and other embodiments of the disclosed disclosure(s) will come to mind to one skilled in the art having the benefit of the teachings presented in the foregoing descriptions and the associated drawings. Therefore, it is to be understood that the disclosure(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A user equipment (UE) comprising:
a transceiver, which, in operation, receives, from a base station, information including a plurality of random access configurations having a sequential order, the random access configuration being defined per subcell of a cell served by the base station for the UE to perform random access communication, a wireless frequency resource domain of the cell being divided into subcells such that the subcells respectively have different wireless frequency resource domains that are served by the base station; and
circuitry, which, in operation,
performs a random access procedure, using a configuration of the plurality of random access configurations, and determining an identification (ID) of a subcell based on a position of the configuration in the sequential order, and
performs a physical layer behavior selected from search space randomization, scrambling sequence and reference signal generation, or Cyclic Redundancy Check (CRC) masking, using the ID of the subcell having a corresponding one of the different wireless frequency resource domains.

2. The UE according to claim 1, wherein the information includes the ID of the subcell.

3. The UE according to claim 1, wherein the information is system information, and the subcells are configured by the system information.

4. The UE according to claim 1, wherein a group-common control channel or a group-common search space is configured per subcell.

5. The UE according to claim 1, wherein the subcells are sequentially associated with the plurality of random access configurations.

6. The UE according to claim 1, wherein the information includes all random access configurations.

7. A communication method comprising:
receiving, from a base station, information including a plurality of random access configurations having a sequential order, the random access configuration being defined per subcell of a cell served by the base station for the UE to perform random access communication, a wireless frequency resource domain of the cell being divided into subcells such that the subcells respectively have different wireless frequency resource domains that are served by the base station;
performing a random access procedure, using a configuration of the plurality of random access configurations, and determining an identification (ID) of a subcell based on a position of the configuration in the sequential order; and
performing a physical layer behavior selected from search space randomization, scrambling sequence and reference signal generation, or Cyclic Redundancy Check (CRC) masking, using the ID of the subcell having a corresponding one of the different wireless frequency resource domains.

8. The UE according to claim 1, wherein the random access configuration includes at least one of a Physical Random Access Channel (PRACH) configuration or a Random Access Response (RAR) configuration.

9. The UE according to claim 2, wherein the ID of the subcell is assigned to the UEs in a same subcell.

* * * * *